United States Patent [19]

Howe

[11] Patent Number: 5,165,758
[45] Date of Patent: Nov. 24, 1992

[54] PLACE AND BUNDLE METHOD FOR THE MANUFACTURE OF BRUSH SEALS

[75] Inventor: Harold Howe, Orlando, Fla.
[73] Assignee: Technetics Corporation, DeLand, Fla.
[21] Appl. No.: 741,766
[22] Filed: Aug. 7, 1991
[51] Int. Cl.⁵ ............................................. A46D 9/00
[52] U.S. Cl. ..................................................... 300/21
[58] Field of Search .................. 300/21; 228/159, 160, 228/178, 212

[56] References Cited

U.S. PATENT DOCUMENTS

| Re. 30,206 | 2/1980 | Ferguson et al. | 300/21 X |
|---|---|---|---|
| 885,032 | 4/1908 | Ferranti | 277/53 X |
| 2,672,640 | 3/1954 | Peterson et al. | 300/21 X |
| 3,408,112 | 10/1968 | Piotrowski | 300/21 |
| 3,917,150 | 11/1975 | Ferguson et al. | 228/159 |
| 4,204,629 | 5/1980 | Bridges | 300/21 X |
| 4,274,575 | 6/1981 | Flower | 29/445 X |
| 4,642,867 | 2/1987 | Hough et al. | 300/21 X |
| 4,678,113 | 7/1987 | Bridges et al. | 300/21 X |
| 4,730,876 | 3/1988 | Werner et al. | 300/2 |
| 4,807,938 | 2/1989 | Weihrauch | 300/21 |
| 4,839,997 | 6/1989 | Pritchard | 51/DIG. 17 X |
| 4,954,305 | 9/1990 | Weihrauch | 300/21 X |

FOREIGN PATENT DOCUMENTS 2145861  2/1973 France ........................... 300/21

*Primary Examiner*—Mark Rosenbaum
*Assistant Examiner*—Frances Chin
*Attorney, Agent, or Firm*—Art Greif

[57] ABSTRACT

A long ribbon, composed of a multitude of fine wires, is placed at the requisite bristle angle onto a backing ring. A torch, welds the ribbon to the backing plate and simultaneously severs the ribbon—forming a first bundle of wires. The severed ribbon is repositioned, relative to the backing ring, adjacent to the first bundle, and the ribbon is again welded in-place and cut. The procedure of placement, welding and cutting is repeated until the backing plate (or the ribbon) has been repositioned over the desired length of the plate to achieve the requisite bristle array of the brush seal.

9 Claims, 2 Drawing Sheets

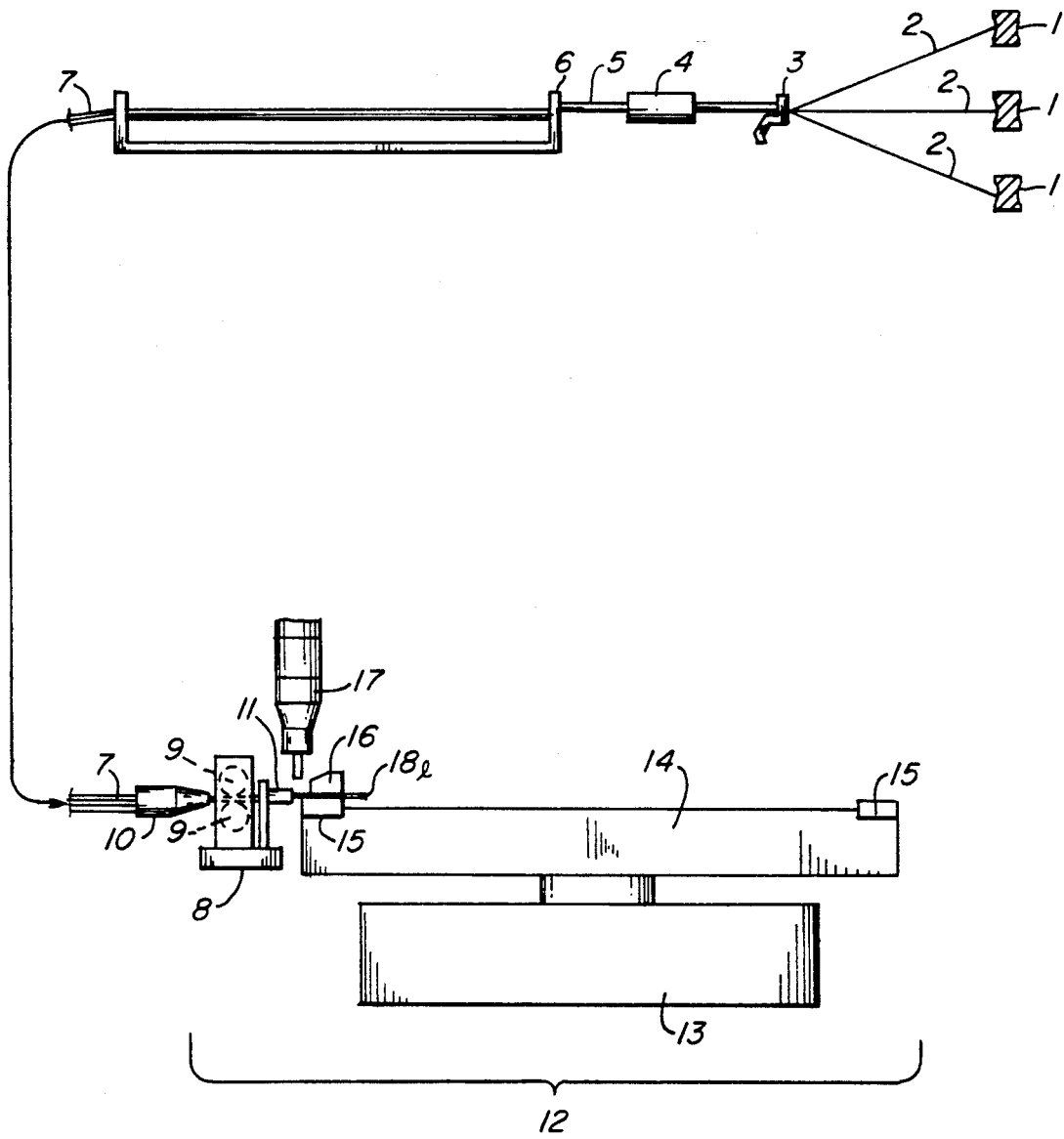

PLACE AND BUNDLE METHOD FOR THE MANUFACTURE OF BRUSH SEALS

TECHNICAL FIELD

This invention relates to a method for the manufacture of brush seals by feeding a ribbon, composed of many fine strands of wire, onto a plate member, welding the ribbon to the plate and cutting the ribbon to form a bundle of strands of a desired length and adding an additional cover plate to form a brush seal.

BACKGROUND

The use of brush elements to effect a seal between rotating members dates back to the early part of this century; for example, see U.S. Pat. No. 885,032. Although various methods are available for the production of brushes, two basic methods are now generally employed in the production of brush seals for rotating elements -- particularly as such seals are employed in turbo-machinery. The first such method can be described as the "bundle and place" method, and is exemplified by the varying techniques shown in U.S. Pat. Nos. 2,672,640; R. E. 30,206; 4,274,575 and 4,678,113. The differing procedures shown in these patents have two elements in common, they: (i) first form a bundle composed of a multitude of bristles by employing some method of securing the bristles in a substantially parallel arrangement and thereafter (ii) employ a procedure for placing the bundle onto an annular backing member and joining the bundles to the backing member, to make up the seal.

The subsequently developed method employs a winding machine to rapidly wind the wire onto a mandrel; wherein (i) the mandrel itself may be the backing member which will form the brush seal, i.e., as shown in U.S. Pat. Nos. 4,204,629, 4,642,867 and 4,732,339, or (ii) the wound mandrel is used to hold the multitude of bristles for subsequent placement onto the annular backing ring, as shown in U.S. Pat. No. 4,730,876. Initially, such winding procedures appeared to offer significant advantages because of their suitability to rapid production and automation. However, they have proven unsuitable in the production of small diameter brush seals, because long lengths of wound bristles are unsuitable to achieving the required bristle inclination relative to the backing member. Moreover, winding around the backing member dictates that a significant portion of the wrapped wires be scrapped—after cutting. When employed in turbine engines, the strands which form the brush are normally expensive, high temperature, exotic metal alloys or ceramics—such that the scrapped material adds significantly to the cost of production. Additional disadvantages of such winding procedures are noted in U.S. Pat. No. 4,678,113.

To overcome such disadvantages, the '113 Patent discloses a manual "bundle and place" method which requires: the formation of a self-supporting ribbon (or tape) composed of many fine strands of wires—adhesively bonded together, cutting the tape into a plurality of tufts, securing the tufts to a backing plate, and removing the adhesive from the portion of the tape projecting from the backing plate. A variant procedure, better adapted to automation, is disclosed in a related patent, U.S. Pat. No. 4,642,867, the disclosure of which is incorporated herein, by reference. The method shown in the '867 Patent delays the cutting step (of the '113 Patent) by feeding the adhesively bonded tape onto the backing ring (which is fitted onto a rotating work bed), clamping a portion of the tape to the backing ring—utilizing a finger clamp for each tape width, and then cutting the tape to form a bundle of strands clamped to the ring. After the required number of bundles have been clamped around the circumference of the backing ring, clamping rings are fitted onto the backing ring to permit the removal of the clamping fingers. Thereafter, a second cover plate is placed onto the work—sandwiching the bundles between the two plates. The outer periphery of the annular sandwich is then welded, to secure the two side plates with the bundles therebetween, to form a brush seal.

DISCLOSURE OF INVENTION

It has been found that both the method and the apparatus shown in the '867 Patent can be substantially simplified by modifying the procedures shown therein—utilizing what may be termed a "place and bundle" method. In this new method, the formation of a self-supporting bundle is accomplished after a long ribbon, which may comprise from 200 to 500 strands of fine wire having a diameter of 5 to 10 cm., is fed into position placed) onto the backing plate. Subsequent to such placement, the ribbon is secured to the plate and cut, to form a bundle of the desired length. While the welding and cutting can be accomplished in distinct stages, it is preferably achieved simultaneously—whereby the welding torch: (i) forms a weld bead to both bind the bristles together to form bundle and to weld the bundle to the backing plate and (ii) cuts the ribbon—permitting it to be repositioned by feeding it to an adjacent position on the backing plate. This procedure, of feeding the ribbon into position on the backing plate and welding (and simultaneously cutting) the ribbon to the plate, is repeated until the backing plate has been indexed a full 360 degrees. The instant process, which involves comparatively few, repetitive steps can readily be adopted to automation.

BRIEF DESCRIPTION OF THE DRAWINGS

FIG. 1 is a schematic diagram showing the formation of a long ribbon of individual strands and the feeding of the ribbon, to a welding and cutting station, wherein self-supporting bundles are formed by welding a portion of the ribbon to the backing ring, and FIGS. 2a, b, and c are face views of a backing ring, illustrating a sequence of ribbon placements and weldments, to produce a segment of bundles, welded in-place.

MODES FOR CARRYING OUT THE INVENTION

Figure 2A:
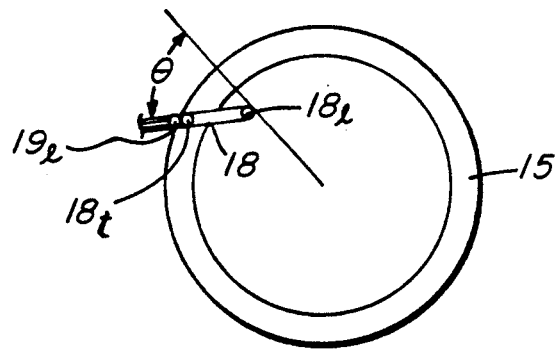

As indicated above, the formation of a self-supporting bundle is achieved in the instant process, after the ribbon is fed to the backing plate—eliminating the need to form a self-supporting, adhesively bonded tape as required by the '867 Patent. Referring to FIG. 1, the formation of a ribbon composed of many fine wires, may be accomplished in conventional manner. Several spools 1 of fine wire 2 are fed through a pigtail collector 3 and tensioner 4 to produce an assembly 5 of several strands which is wound around rotatable collector 6 to produce a multi-strand ribbon 7 which is fed to feeder 8 and to welding/cutting station 12. Feeder 8 employs opposed, counter-rotating, rubber-coated, rolls 9 to gently force the ribbon toward the work area. Rolls 9 are preceded by guide 10, which takes the many wires, which may be somewhat scattered at this point, and funnels them into a tighter pack towards the rolls. On exiting the rolls, the ribbon again passes through a guide 11, which in addition to its funneling function may also act as a heat sink. Station 12 is comprised of an indexing turntable 13, onto which is mounted a rotable platform 14, which is preferably formed from copper or other conductive material, to act as a heat sink during the welding procedures. A backing plate, e.g., ring 15, which will form one of the side plates of the final brush seal, is mounted onto platform 14, in tight engagement therewith, such as by friction fit. The ribbon, fed into position onto ring 15 to the desired bundle length, is held in place by clamping heat sink 16 and welded to the ring by torch 17. Desirably, the torch employed will have the ability to both weld the wires to the plate and to melt-back the wires; so as to simultaneously sever the ribbon. Welders having such a capability are TIG (Gas Tungsten Arc), Electron Beam, Laser and Plasma Torches.

Figure 2B:
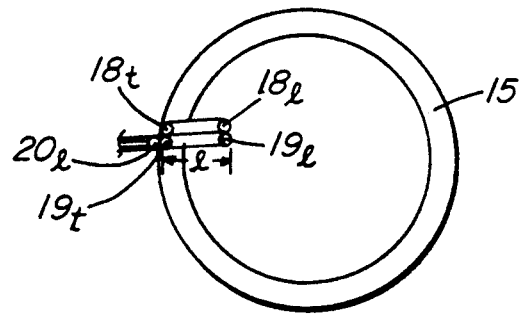
Figure 2C:
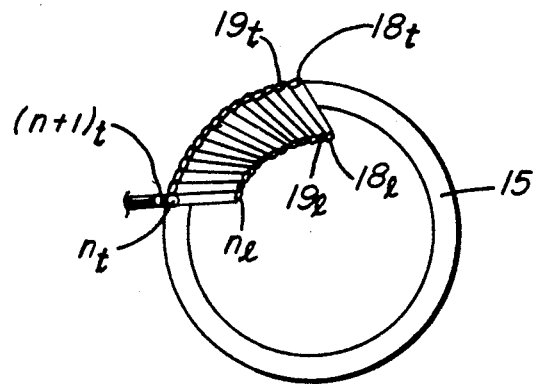

A preferred procedure for accomplishing the placement, and welding/cutting of the ribbon will better be understood by referring to FIGS. 1 and 2. The many fine strands comprising ribbon 7 are maintained in-place by feeder 8, which pushes the ribbon into position, (i.e., with the bristles extending the requisite length, 1, and the longitudinal axis of the ribbon inclined at the requisite angle, $\theta$, with respect to a radius of the ring), onto backing ring 15. Bundle length is dependent on the thickness of the backing plate and the inclination angle. Plate thickness, in the case of a ring, will be the difference between the I.D. and O.D. of the ring. Desirably, the ribbon will be sufficiently long to provide sufficient bundles for at least one complete ring. It is preferable, to maintain the strands in-place, to form a bead $18_1$ at the leading end of the ribbon as it is first fed to the backing ring. Subsequent inner beads, $19_1$, $20_1$ . . . $n_1$ will be formed, in accord with the preferred method, as the ribbon is both welded to the ring and simultaneously cut during the welding/cutting stage. When the ribbon is in proper position on the backing ring, clamp 16 is lowered to provide a retaining force to the ribbon and to act as a heat sink while welding. Thereafter, TIG welding torch 17, is lowered, both to weld end $18_t$ of the ribbon to the backing ring, and to simultaneously sever the ribbon—eliminating the need for a separate cut-off operation. The resultant bundle 18, comprised of leading end $18_1$ and trailing end $18_t$ is now a supported bundle welded to ring 15. Torch 17 and clamp 16 are lifted and ring 15 is then rotated a circumferential distance, (approximately representing the width, w, of ribbon 7) by incrementing turntable 14 to the next predetermined position. Ribbon 7, which will already have a new leading-end weld bead, $19_1$, formed during the previous welding/cutting step, is then pushed to the next position (FIG. 2b) on ring 15, and the process repeated until the backing member, whatever its shape, has received its full complement of bundles. FIG. 2c, shows a face view of a backing ring, in which the process has been repeated to secure bundles over approximately 40° of its outer diameter—illustrating the substantially parallel (i.e., in which the longitudinal axes are offset a few degrees from parallelism) relationship of the so-placed bundles, in the formation of a brush seal.

After the backing ring has received its full complement of bundles, the final seal may be produced in conventional manner (see, for example, U.S. Pat. No. 4,642,867). A cover ring (not shown) is placed over the backing ring so as to sandwich the welded bundles between the two rings. The resulting sandwich is then made fast, e.g., by welding. One or more finishing procedures will then employed to trim the sealing ends of the bristles to the desired diameter (in the example shown, this is the inner diameter bristles). Such trimming may be accomplished by a variety of cutting or grinding methods, well known to the art.

As noted above, the completed brush seal will normally be composed of two plate members, (i) a backing ring with the brush elements welded thereto and (ii) a covering ring placed over the brush elements. It should be noted, however, that the brush elements need not be welded to a plate member. For example, the brush elements can be welded to a thin, washer-like, insert member to provide a replaceable brush insert. The resultant insert, with the brush elements welded thereto, is subsequently joined to the backing members. Thus, the insert would be sandwiched between the two plate members, wherein the washer-like insert would itself be joined to both plate members. The joining method employed would provide a brush seal, in which, the insert could readily be disengaged without significant damage to the reusable plate members. When the brush elements become significantly worn, it would only be necessary to remove the insert and replace it with a new, brush insert—eliminating the need to remachine a new set of plate members.

I claim:

1. A place and bundle method for the production of an array of bristles for use in the production of a brush seal, said array being comprised of a multitude of aligned, contiguous bundles of bristles secured to a backing plate; said backing plate having two, approximately equidistant edges, a sealing edge and trailing edge, which comprises, providing a ribbon of fibers, said ribbon being composed of a multitude of individual strands of fiber, feeding the ribbon onto the backing plate, the ribbon being positioned at a predetermined angle with respect to said plate, with the leading end of the ribbon projecting past the sealing edge of the plate, permanently securing a portion of the ribbon, at a line along the entire width thereof, to a portion of the plate and cutting the ribbon at a line near the trailing edge of the plate, thereby forming a first supported bundle of bristles, repositioning the remaining ribbon and feeding it onto the backing plate, so that the ribbon is substantially contiguous to said first bundle, and its longitudinal axis is substantially parallel to the axis of the first bundle, repeating the securing, cutting and repositioning steps to produce said array.

2. The method of claim 1, wherein said brush seal is designed for use in turbine engines and said fibers are made from high temperature metal alloys, wherein said securing of the ribbon is accomplished by welding the high temperature alloy fiber of said ribbon to the backing plate.

3. The method of claim 2, wherein said welding is conducted so as to both weld the ribbon to the trailing edge and substantially simultaneously, to cut the ribbon.

4. The method claim 3, wherein said simultaneous welding and cutting are conducted to also produce a weld bead at the cut end of the ribbon, said bead acting to secure together the fibers in the newly formed leading end of the ribbon.

5. The method of claim 1, wherein said backing plate is in the form of a ring, and including the step of fitting said ring onto a rotating table.

6. The method of claim 3, wherein said backing plate is in the form of a ring fitted onto a rotating table and said securing, cutting and repositioning steps are repeated to produce an array of bundles around the entire circumference of the ring.

7. The method of claim 6, wherein said ring sealing edge is the inner diameter of the ring, feeding that the ribbon to the ring such that it initially projects a distance of 0.2 to 1.0 cm from said inner diameter.

8. The method of claim 6, wherein said ring sealing edge is the outer diameter of the ring, feeding the ribbon to the ring such that it initially projects a distance of 0.2 to 1.0 cm from said outer diameter.

9. The method of claim 6, in which said backing member is a thin, washer-like member including the steps of sandwiching said washer-like member between two plate members and joining it thereto.

* * * * *

UNITED STATES PATENT AND TRADEMARK OFFICE
CERTIFICATE OF CORRECTION

PATENT NO.    :   5,165,758

DATED         :   November 24, 1992

INVENTOR(S)   :   Harold Howe

It is certified that error appears in the above-identified patent and that said Letters Patent is hereby corrected as shown below:

In column 2, line 23, delete "having a diameter of 5 to 10 cm"; and in line 24, insert "(" before the word "placed".

In column 3, line 27, delete "length, l," and replace with --length, $\ell$,--; in line 36, delete "$18_l$" and replace with --$18_\ell$--; in line 38, delete "$19_l, 20_l \ldots n_l$" and replace with --$19_\ell, 20_\ell \ldots n_\ell$--; in line 49, delete "$18_l$" and replace with --$18_\ell$--; and in line 55, delete "$19_l$" and replace with --$19_\ell$--.

In column 4, line 5, insert --be-- after the word "then".

In claim 7, column 5, line 12, delete "that".

In claim 9, column 6, line 8, delete "member" and replace with --plate--.

Signed and Sealed this

Sixteenth Day of September, 1997

Attest:

BRUCE LEHMAN

*Attesting Officer*   *Commissioner of Patents and Trademarks*